US012600378B2

(12) United States Patent
Urano et al.

(10) Patent No.: US 12,600,378 B2
(45) Date of Patent: Apr. 14, 2026

(54) AUTONOMOUS DRIVING SYSTEM

(71) Applicant: TOYOTA JIDOSHA KABUSHIKI KAISHA, Toyota (JP)

(72) Inventors: Hiromitsu Urano, Numazu (JP); Masamichi Ohsugi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 18/775,671

(22) Filed: Jul. 17, 2024

(65) Prior Publication Data

US 2025/0033664 A1    Jan. 30, 2025

(30) Foreign Application Priority Data

Jul. 26, 2023    (JP) ................................ 2023-121713

(51) Int. Cl.
*B60W 60/00* (2020.01)
*G06F 12/02* (2006.01)

(52) U.S. Cl.
CPC ......... *B60W 60/001* (2020.02); *G06F 12/023* (2013.01); *B60W 2530/18* (2013.01)

(58) Field of Classification Search
CPC ........... B60W 60/001; B60W 2530/18; B60W 50/00; B60W 60/0025; B60W 2050/0005; G06F 12/023; G01C 21/3438; G01C 21/3469; G07C 5/0841; B60L 3/12
See application file for complete search history.

(56) References Cited

U.S. PATENT DOCUMENTS

| | | | |
|---|---|---|---|
| 12,198,479 B2 * | 1/2025 | Hayashi | G07C 5/02 |
| 2017/0200330 A1 * | 7/2017 | Gupta | G06F 3/0604 |
| 2017/0268895 A1 | 9/2017 | Myers et al. | |
| 2018/0065808 A1 * | 3/2018 | James | G06Q 10/08 |
| 2018/0164814 A1 * | 6/2018 | Poeppel | G06Q 10/20 |
| 2018/0340792 A1 * | 11/2018 | Kolluru | G01C 21/34 |
| 2019/0196730 A1 * | 6/2019 | Imran | G06F 3/0625 |
| 2020/0026435 A1 | 1/2020 | Satou et al. | |
| 2020/0302233 A1 | 9/2020 | Iwasaki | |
| 2021/0067582 A1 * | 3/2021 | Boehm | H04W 4/44 |
| 2023/0119474 A1 | 4/2023 | Yamaoka et al. | |
| 2023/0283471 A1 * | 9/2023 | Schooler | H04L 9/3268 |
| | | | 713/168 |
| 2024/0330791 A1 * | 10/2024 | Mahmoudi | G06Q 50/40 |
| 2024/0351606 A1 * | 10/2024 | Hormasji | G07C 5/085 |

FOREIGN PATENT DOCUMENTS

| | | |
|---|---|---|
| JP | 2011-113494 A | 6/2011 |
| JP | 2019-056559 A | 4/2019 |
| JP | 6761002 B2 | 9/2020 |
| JP | 2022-044235 A | 3/2022 |
| WO | 2019/116423 A1 | 6/2019 |

* cited by examiner

*Primary Examiner* — Anne Marie Antonucci
*Assistant Examiner* — Jordan T Smith
(74) *Attorney, Agent, or Firm* — Dinsmore & Shohl LLP

(57) ABSTRACT

Processing for autonomous driving control of a vehicle, processing to store log data related to the autonomous driving control in one or more memory devices during an execution of the autonomous driving control, and processing to predict a mileage of the vehicle is executed. In the processing to predict the mileage, a free space of the one or more memory devices in which log data is stored is acquired. In addition, the mileage is set according to the acquired free space. The mileage is set to be shorter as the free space is smaller.

5 Claims, 6 Drawing Sheets

$$QC\_Ck(Tds)=QC(Tcl)-\int \Delta Qt\_Ckdt$$

AUTONOMOUS DRIVING SYSTEM

CROSS-REFERENCE TO RELATED APPLICATION

The present application claims priority under 35 U.S.C. § 119 to Japanese Patent Application No. 2023-121713, filed on Jul. 26, 2023, the contents of which application are incorporated herein by reference in their entirety.

TECHNICAL FIELD

The present disclosure relates to a system for autonomous driving control of a vehicle.

BACKGROUND

In recent years, an autonomous driving technology for controlling a vehicle from data of sensors mounted on the vehicle using models generated through machine learning (machine learning models) has been developed. WO2019116423A proposes a method for collecting training datasets for use in generating machine learning models.

Examples of documents showing the technical level of technical field related to the present disclosure include JP2011113494A, JP2022044235A and JP6761002B, in addition to WO2019116423A.

It is desirable that the autonomous driving control of the vehicle performed using the machine learning models be verified later. As a method for enabling this verification, it is conceivable to store log data related to the autonomous driving control of the vehicle in the memory device of the vehicle. However, a capacity of the memory device of the vehicle is limited. Therefore, when a data amount of the log data reaches a certain amount or more, the log data may be transmitted to an outside of the vehicle and deleted from the memory device. However, during the execution of the autonomous driving control, log data related to the autonomous driving control is generated every moment. Therefore, when a free space of the memory device is filled with the log data before being transmitted to the outside and the log data generated during the autonomous driving control, the latter log data may not be stored from the midway. Therefore, it is desired to develop a technique for avoiding such a tight situation.

An object of the present disclosure is to provide a technique that can prevent a situation in which the free space of the memory device of the vehicle in which the autonomous driving control using machine learning models is performed is filled with log data related to the autonomous driving control.

SUMMARY

The present disclosure is an autonomous driving system mounted in a vehicle, and has the following features.

The autonomous driving system includes one or more processors and one or more memory devices.

The one or more processors is configured to execute processing for autonomous driving control of the vehicle, processing to store log data related to the autonomous driving control in the one or more memory devices during an execution of the autonomous driving control, and processing to predict a mileage of the vehicle.

In the processing to predict the mileage, the one or more processors is configured to acquire a free space of the one or more memory devices in which the log data is stored and to set the mileage in accordance with the free space. The mileage is set to be shorter as the free space is smaller.

According to the present disclosure, the mileage of the vehicle is predicted according to the free space of the one or more memory devices. The mileage is set to a shorter distance as the free space is smaller. Therefore, it is possible to avoid a situation in which the free space is tight.

DESCRIPTION OF EMBODIMENT

1. Autonomous Driving of Vehicle

Figure 1:
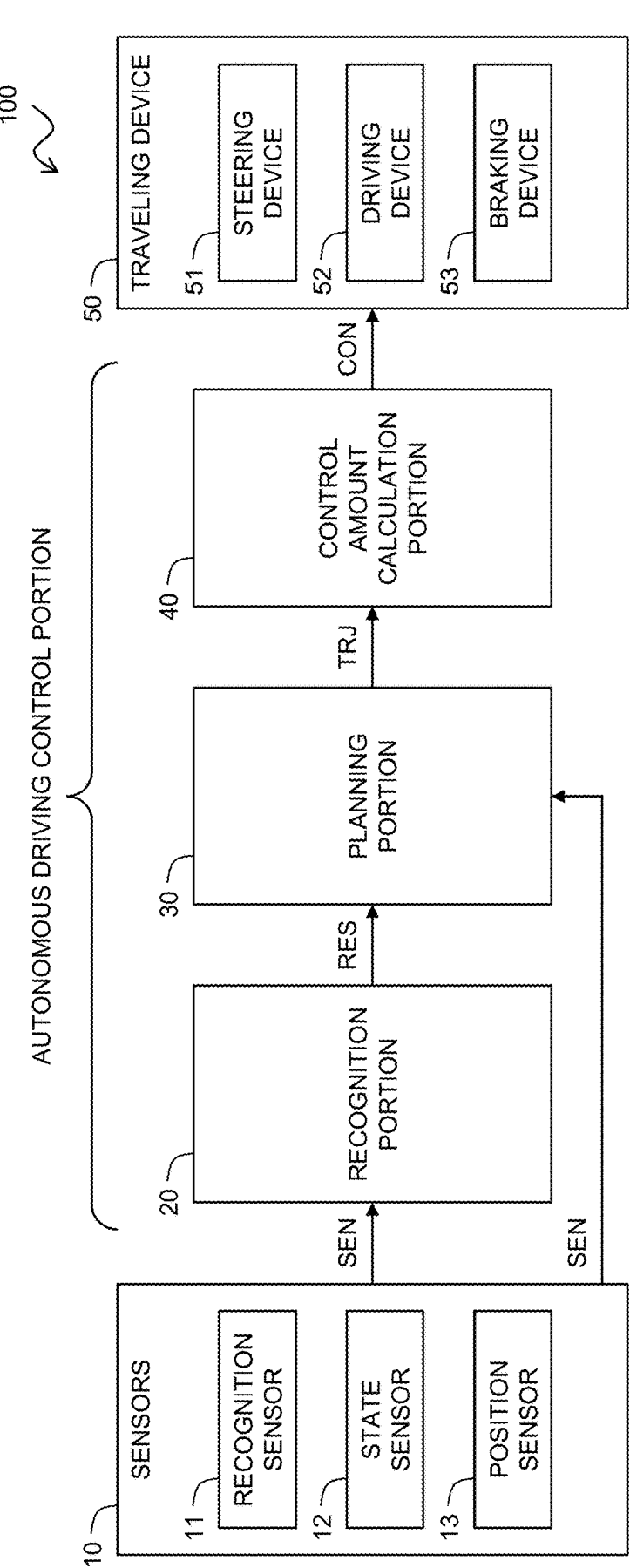
FIG. 1 is a block diagram for illustrating a configuration example related to autonomous driving control of a vehicle according to an embodiment of the present disclosure.

FIG. 1 is a block diagram fir illustrating a configuration example related to autonomous driving control of a vehicle 1 according to an embodiment according to the present disclosure. The autonomous driving is a driving in which at least one of steering, acceleration, and deceleration of the vehicle 1 is performed automatically without depending on a driving operation by an operator. The autonomous driving control is a concept including not only the completely autonomous driving control but also risk avoidance control, lane keep assist control, and the like. The operator may be a driver riding in the vehicle 1 or a remote operator who remotely operates the vehicle 1.

The vehicle 1 includes sensors 10, a recognition portion 20, a planning portion 30, a control amount calculation portion 40, and a driving device 50.

The sensors 10 include a recognition sensor 11 used for recognizing a situation around the vehicle 1. Examples of the recognition sensor 11 include a camera, a laser imaging detection and ranging (LIDAR), and a radar. The sensors 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, and a steering angle sensor. Examples of the position sensor 13 include a global navigation satellite system (GNSS) sensor.

The information on sensor detection SEN is information obtained by the sensors 10. For example, the information on sensor detection SEN includes an image captured by a camera. As another example, the information on sensor detection SEN may include point group information obtained by the LIDAR. The information on sensor detection SEN may include vehicle status information indicating the status of the vehicle 1. The information on sensor detection SEN may include positional information indicating the position of the vehicle 1.

The recognition portion 20 receives information on sensor detection SEN. The recognition portion 20 recognizes a surrounding situation of the vehicle 1 based on the information obtained by the recognition sensor 11. For example, the recognition portion 20 recognizes an object around the vehicle 1. Examples of the object include a walker, other vehicles (e.g., a preceding vehicle, a parking vehicle, and the like), a white lane, a road construction (e.g., a guard rail, a curb), a fallen object, a traffic light, an intersection, a mark, and the like. The information on recognition result RES indicates a recognition result by the recognition portion 20. For example, the information on recognition result RES includes object information indicating a relative position and a relative speed of the object with respect to the vehicle 1.

The planning portion 30 receives the information on recognition result RES from the recognition portion 20. In addition, the planning portion 30 may receive vehicle status information, positional information, and pre-generated map information. The map information may be high-precision three-dimensional map information. The planning portion 30 generates a driving plan of the vehicle 1 based on the received information. The driving plan may be for the one to reach a destination set in advance or for the one to avoid a traffic risk. Examples of the driving plan include maintaining the current traveling lane, changing lanes, overtaking, turning right or left, steering, accelerating, decelerating, and stopping. Further, the planning portion 30 generates a target trajectory TRJ required for the vehicle 1 to travel in accordance with the driving plan. The target trajectory TRJ includes a target position and a target speed.

The control amount calculation portion 40 receives the target trajectory TRJ from the planning portion 30. The control amount calculation portion 40 calculates a control amount CON required for the vehicle 1 to follow the target trajectory TRJ. The control amount CON may be a control amount required to reduce a deviation between the vehicle 1 and the target trajectory TRJ. The control amount CON includes at least one of a steering control amount, a drive control amount, and a braking control amount. Examples of the steering control amount include a target steering angle, a target torque, a target motor angle, and a target motor drive current. Examples of the drive control amount include target speed, target acceleration, and the like. Examples of the braking control amount include target speed, target deceleration, and the like.

The driving device 50 includes a steering device 51, a driving device 52, and a braking device 53. The steering device 51 steers the wheels. For example, the steering device 51 includes an electric power steering (EPS) device. The driving device 52 is a power source that generates a driving force. Examples of the driving device 52 include an engine, an electric motor, and an in-wheel motor. The braking device 53 generates a braking force. The driving device 50 receives the control amount CON from the control amount calculation portion 40. The driving device 50 operates the steering device 51, the driving device 52, and the braking device 53 in accordance with the steering control amount, the drive control amount, and the braking control amount, respectively. As a result, the vehicle 1 travels so as to follow the target trajectory TRJ.

The recognition portion 20 includes at least one of rule-based and machine learning models. The rule-based models execute recognition processing based on a predetermined rule group. Examples of the machine learning models include a neural network (NN), a support vector machine (SVM), a regression model, and a decision tree model. The NN may be a convolutional neural network (CNN), a recurrent neural network (RNN), or a combination thereof. The type of each layer, the number of layers, and the number of nodes in the NN are arbitrary. The machine learning models are generated in advance through machine learning. The recognition portion 20 executes recognition processing by inputting the information on sensor detection SEN to the models. The information on recognition result RES is output from the models or generated based on the output from the models.

The planning portion 30 includes at least one of the rule-based models and the machine learning models. The planning portion 30 executes planning processing by inputting the information on recognition result RES to the models. The target trajectory TRJ is output from the models or generated based on the output from the models.

The control amount calculation portion 40 includes at least one of the rule-based models and the machine learning models. The control amount calculation portion 40 executes control amount calculation processing by inputting the target trajectory TRJ to the models. The control amount CON is output from the models or generated based on the output from the models.

Two or more of the recognition portion 20, the planning portion 30 and the control amount calculation portion 40 may be integrally configured. All of the recognition portion 20, the planning portion 30 and the control amount calculation portion 40 may be integrally configured (End-to-End configuration). For example, the recognition portion 20 and the planning portion 30 may be integrally configured by the NN that outputs the target trajectory TRJ from the information on sensor detection SEN. Even in the case of the integrated configuration, an intermediate product such as the information on recognition result RES or the target trajectory TRJ may be output. For example, when the recognition portion 20 and the planning portion 30 are integrally configured by the NN, the information on recognition result RES may be an output of an intermediate layer of the NN.

The recognition portion 20, the planning portion 30 and the control amount calculation portion 40 constitute an autonomous driving control portion that controls the autonomous driving of the vehicle 1. In the present embodiment, the machine learning models are used for at least a part of the autonomous driving control portion. That is, at least one of the recognition portion 20, the planning portion 30 and the control amount calculation portion 40 may include the machine learning models. The autonomous driving control portion executes at least a part of autonomous driving control of the vehicle 1 using machine learning models.

2. Autonomous Driving System

Figure 2:
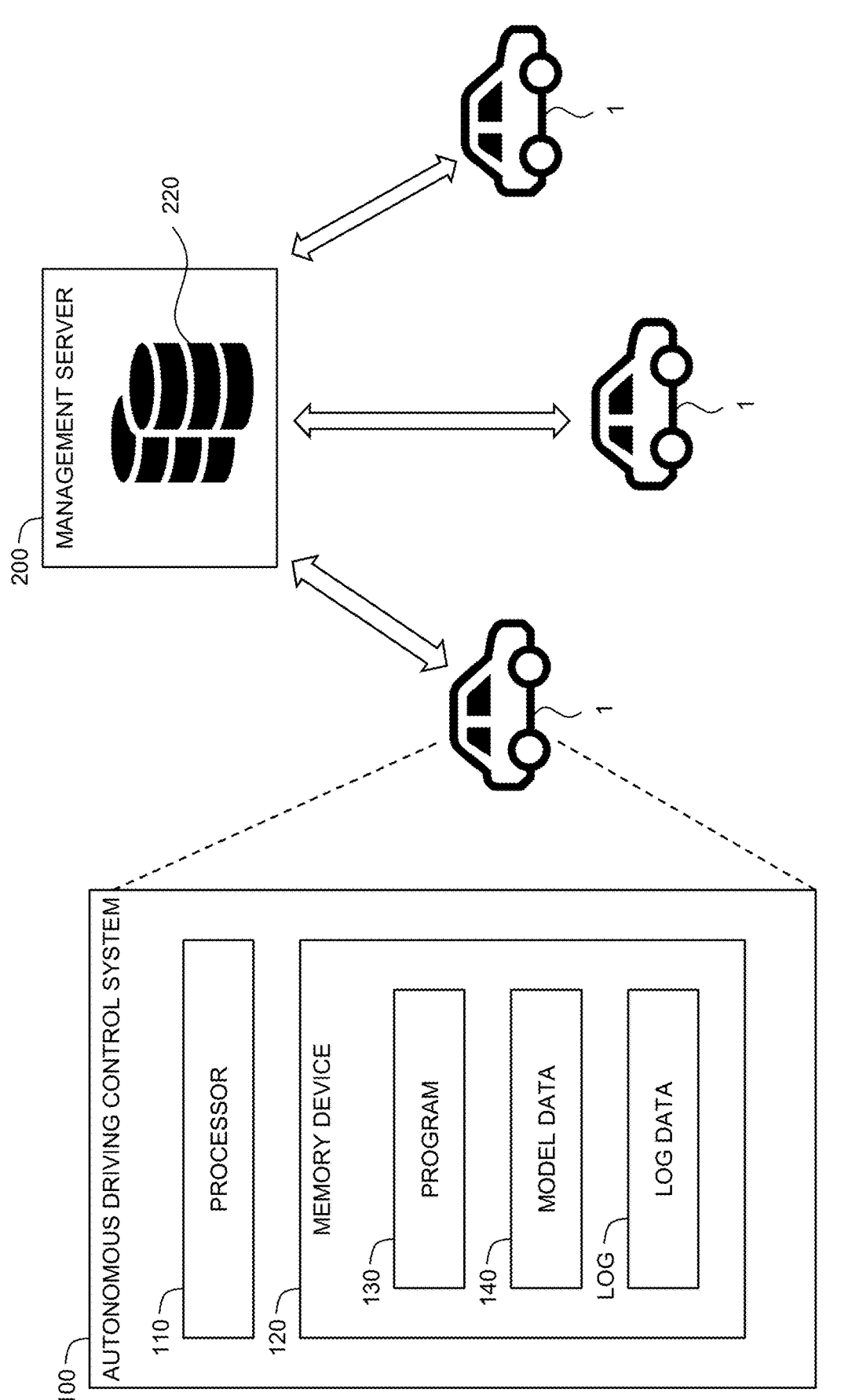
FIG. 2 is a conceptual diagram for illustrating a configuration example of an autonomous driving system according to the embodiment.

FIG. 2 is a conceptual diagram for illustrating a configuration example of an autonomous driving system 100 according to the present embodiment. The autonomous driving system 100 is mounted on the vehicle 1 and executes the autonomous driving control of the vehicle 1. The autonomous driving system 100 has at least the function of the autonomous driving control portion described above. The autonomous driving system 100 may further include the sensors 10 and the driving device 50.

The autonomous driving system 100 includes one or more processors 110 (hereinafter, simply referred to as a "processor" 110) and one or more memory devices 120 (hereinafter, simply referred to as a "memory device" 120). The processor 110 executes various processing. Examples of the processor 110 include a central processing unit (CPU), a graphics processing unit (GPU), an application specific integrated circuit (ASIC), and a field-programmable gate array (FPGA). The recognition portion 20, the planning portion 30 and the control amount calculation portion 40 may be implemented by a single processor 110 or may be implemented by separate processors 110. The memory device 120 stores various information. Examples of the memory device 120 include a hard disk drive (HDD), a solid-state drive (SSD), a volatile memory, and a nonvolatile memory.

The program 130 is a computer program for controlling the vehicle 1 and is executed by the processor 110. Various processing executed by the autonomous driving system 100 may be realized by cooperation of the processor 110 executing the program 130 and the memory device 120. The program 130 is stored in the memory device 120. The program 130 may be recorded in a computer-readable recording medium.

The model data 140 is data of the models included in the recognition portion 20, the planning portion 30 and the control amount calculation portion 40. As described above, in the present embodiment, at least one of the recognition portion 20, the planning portion 30 and the control amount calculation portion 40 includes the "machine learning models". The model data 140 is stored in the memory device 120 and used for the autonomous driving control.

During the autonomous driving control, the processor 110 obtains "log data LOG" associated with the autonomous driving control. The log data LOG may include the information on sensor detection SEN input to the autonomous driving control portion. The log data LOG may include the control amount CON output from the autonomous driving control portion. The log data LOG may include the information on recognition result RES output from the recognition portion 20. The log data LOG may include the target trajectory TRJ output from the planning portion 30. The log data LOG may include a reason for determination in the recognition processing by the recognition portion 20. The log data LOG may include a reason for a decision in the planning processing executed by the planning portion 30. The log data LOG may include the presence or absence of an operator intervention for the autonomous driving control.

The processor 110 stores log data LOG acquired during the autonomous driving control in the memory device 120. The processor 110 may temporarily store the log data LOG in the memory device 120 for a predetermined period.

The management server 200 is an external device that exists outside the vehicle 1. The management server 200 includes a database 220. The management server 200 communicates with one or more vehicles 1 via a communication network. During the autonomous driving control or after the autonomous driving control is finished, the processor 110 of the vehicle 1 may upload at least a part of the log data LOG stored in the local memory device 120 to the management server 200. The log data LOG uploaded to the management server 200 is used for a verification of the autonomous driving control using the machine learning models. The processor 110 may delete the log data LOG uploaded to the management server 200 from the local memory device 120.

3. Mileage

In the present embodiment, a case where one or more vehicles 1 are applied to a mobility service is considered. The mobility service is a service for transporting a person by using a vehicle. Examples of the mobility service include a taxi service, a bus service, and a ride-sharer service. The management of the mobility service is performed by, for example, the management server 200. The management of the mobility service includes a management of the vehicle 1 such as a storage and a selection (a vehicle allocation) of the vehicle 1 applied to the mobility service and a management of a user US of the mobility service. The management of the mobility service includes the verification of the autonomous driving control using the log data LOG described above.

Figure 3:
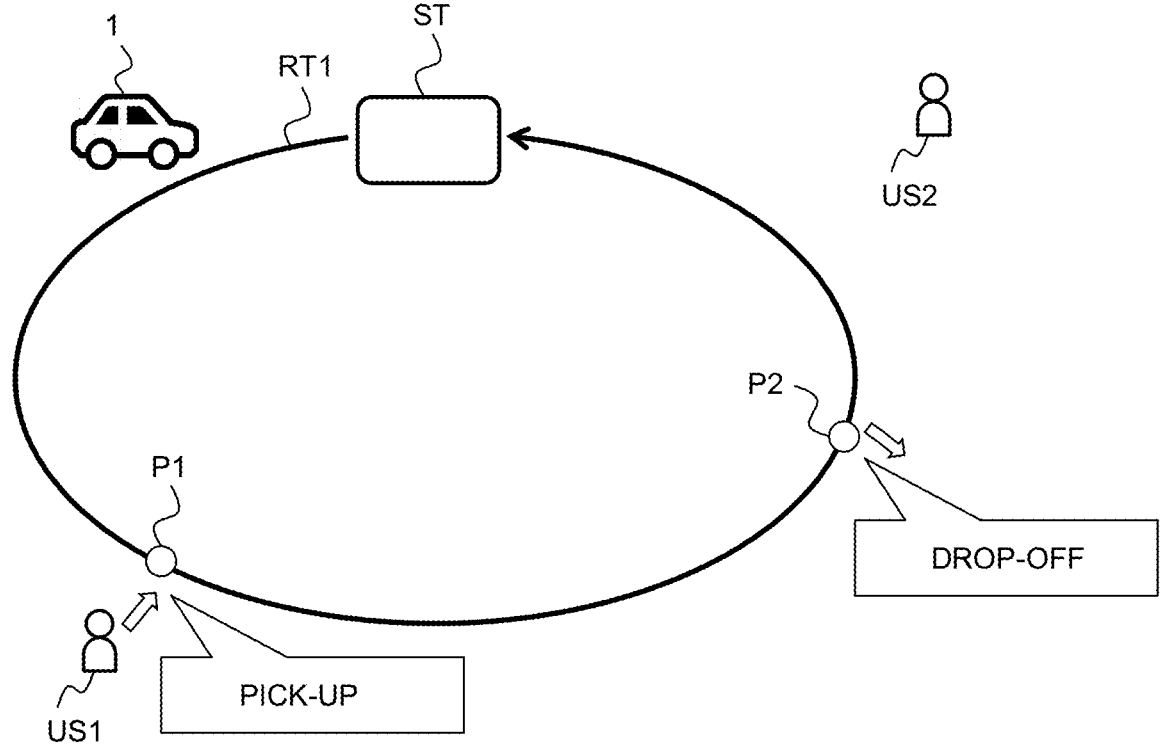
FIG. 3 is a diagram for illustrating a concept of a mobility service.

FIG. 3 is a diagram for illustrating a concept of the mobility service. In FIG. 3, one of the one or more vehicles 1 is depicted. The vehicle 1 transports a user US1 of the mobility service from a point p1 to a point p2 in response to a request from the user US1.

When the vehicle 1 transports the user US1, the vehicle 1 starts from a storage site ST and heads for the point p1. The storage site ST is, for example, a base of the mobility service. The vehicle 1 that has arrived at the point p1 picks up the user US1 at the point p1. The vehicle 1 that has picked up user US1 heads for the point p2 from the point p1. The vehicle 1 that has arrived at the point p2 drops off the user US1 at the point p2. The vehicle 1 that has dropped off the user US1 heads for the storage site ST from the point p2. While heading for the storage site ST from the point p2, the vehicle 1 may transport a user US2 who is different from the user US1 in response to a request from the user US2.

Consider a route RT1 that starts from the storage site ST and returns to the storage site ST via the points p1 and p2. While the vehicle 1 is traveling along a part or all of the route RT1, the autonomous driving control is executed. When the autonomous driving control is executed, the log data LOG is generated. The generated log data LOG is stored in the memory device 120 of the vehicle 1.

Figure 4:
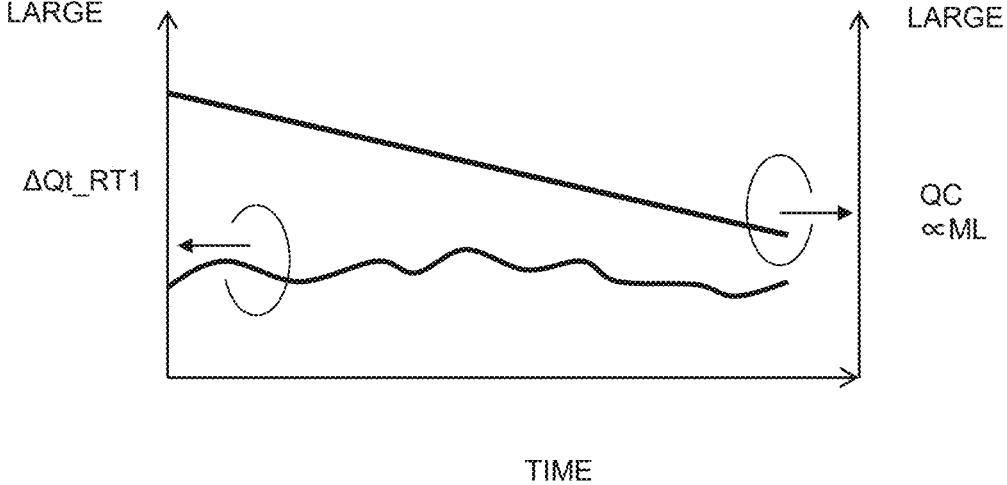
FIG. 4 is a diagram for illustrating an example of a relationship between a duration of an execution of the autonomous driving control and a free space of a memory device.

Here, the log data LOG continues to be generated during the execution of the autonomous driving control. Therefore, during the execution of the autonomous driving control, a total quantity TQst of the log data LOG in the memory device 120 continues to increase. FIG. 4 is a diagram for illustrating an example of a relationship between a duration of the execution of the autonomous driving control and a free space QC. The horizontal axis of FIG. 4 indicates the duration of the execution of the autonomous driving control. In the righthand of the vertical axis of FIG. 4 represents the free space QC.

In the lefthand of the vertical axis of FIG. 4 represents a generated quantity per unit time $\Delta Qt\_RT1$ of the log data LOG. When the execution of the autonomous driving control is continued, the total quantity TQst, which is the integrated value of the generated quantity $\Delta Qt\_RT1$, increases. Then, the free space QC of the memory device 120 continues to decrease. As a result, when the free space QC is tight, there is a possibility that a situation in which the log data LOG cannot be stored from the middle of the route RT1 occurs.

In view of this problem, in the present embodiment, a mileage ML of the vehicle 1 is set. The mileage ML is set according to the free space QC. For example, the relationship between the mileage traveled by the execution of the autonomous driving control and the total quantity TQgn of the log data LOG generated during the travel is calculated in advance. This relationship may be calculated by focusing on a travel history of one vehicle 1 or may be calculated by focusing on travel histories of a plurality of vehicles 1. Using this relationship, the generated quantity $\Delta Ql$ of the log data LOG per unit length (e.g., 1 km) can be determined. The mileage ML can be calculated based on the following equation (1).

$$ML = QC/\Delta Ql \qquad (1)$$

As a concept close to the mileage ML, there is a distance to empty DTE. The distance to empty DTE is set based on a remaining amount of a battery that supplies electric power to the driving source of the vehicle and a remaining amount of fuel. Therefore, the calculated value of the distance to empty DTE and that of the mileage ML are basically different. However, the vehicle 1 is not able to travel a distance exceeding the distance to empty DTE. Therefore, if the mileage ML calculated based on Equation (1) is greater than the distance to empty DTE, the mileage ML may be changed. In this case, the value of the distance to empty DTE is set as the mileage ML.

The setting of the mileage ML is executed, for example, while the vehicle 1 is waiting for a provision of the mobility service in the storage site ST. When the setting of the mileage ML is executed during the standby for the provision of the mobility service, it is possible to avoid a situation in which the free space QC is tight. For example, the vehicle 1 having a mileage ML shorter than a distance L_RTn of a route RTn including the transportation of a user USn (n≥1) of the mobility service is excluded from candidates in charge of the transportation of the user USn in the selection by the management server 200.

In another example, the setting of the mileage ML is executed during a provision of the mobility service (e.g., during the traveling of the vehicle 1 along the route RTn). Even when the setting of the mileage ML is executed during the provision of the mobility service, it is possible to avoid the situation in which the free space QC is tight. However, in this case, since the mileage ML decreases with the decrease in the free space QC, the execution of the autonomous driving control is restricted or stopped. While the execution of the autonomous driving control is restricted or stopped, for example, manual driving by the operator of the vehicle 1 is performed. A switching from the autonomous driving control to the manual driving is performed, for example, when the mileage ML is decreased to a predetermined distance THml (described later), by using a request generated by the processor 110 as a trigger.

4. Enlargement Processing of Free Space

4-1. First Example

Figure 5:
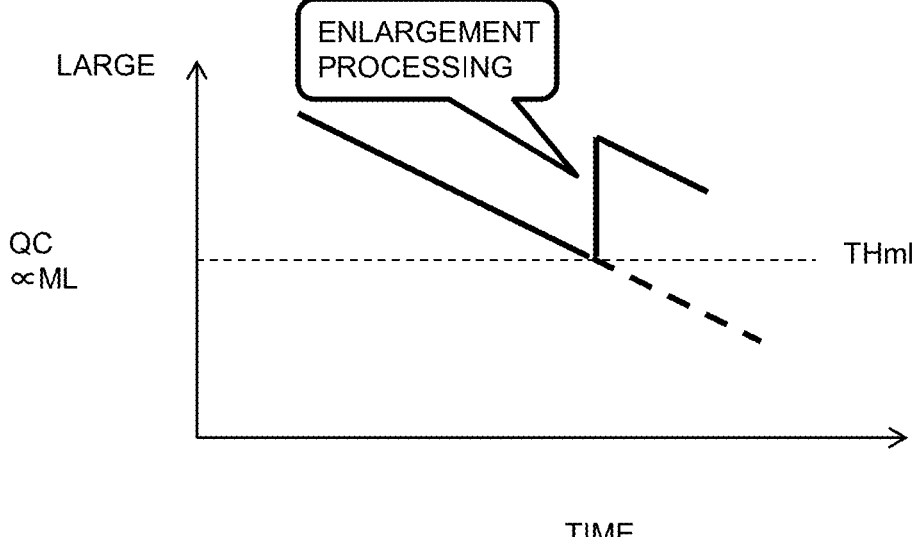
FIG. 5 is a diagram for explaining an enlargement processing of the free space of the memory device.

In the present embodiment, when the mileage ML set according to the free space QC is equal to or less than the predetermined distance THml, enlargement processing of the free space QC may be executed. FIG. 5 is a diagram for explaining the enlargement processing of the free space QC. As described with reference to FIG. 4, when the execution of the autonomous driving control is continued, the free space QC continues to decrease. Here, the generated quantity ΔQt_RT1 shown in FIG. 4 may vary depending on positions, time, surrounding environment, scene, and the like. Therefore, if the state in which the decrease rate of the free space QC is high continues, the free space QC is tight.

Therefore, in the first example, the mileage ML is compared with the predetermined distance THml. This comparison may be performed during the provision of the mobility service or during the standby of this provision. As a result of this comparison, if it is determined that the mileage ML is equal to or less than the predetermined distance THml, the enlargement processing is executed. FIG. 5 shows a transition example of the free space QC when the enlargement processing is executed during the provision of the mobility service. In the enlargement processing, for example, data that has been transmitted to the management server 200 among the log data LOG in the memory device 120 is compressed and stored in the memory device 120. In another example, the log data LOG that has been transmitted to the management server 200 is deleted from the memory device 120.

The predetermined distance THml may be a fixed value or may be set based on the route RTn. In the case of the setting based on the route RTn, for example, an average of the total quantity TQgn of the log data LOG generated during the traveling on the route RTn in the past is used. For the average of the total quantity TQgn, for example, the management server 200 refers to travel histories of one or more vehicles 1 and extracts a route identical or similar to the route RTn. Then, the average is calculated based on the total quantity TQgn of the log data LOG generated during the travel of the extracted route. By adding a margin to this average, the predetermined distance THml is set. Information on the predetermined distance THml set in this way is transmitted to the vehicle 1 that provides the mobility service to the user USn.

4-2. Second Example

In the second example of the enlargement processing, the total distance L_AD of a section S_AD in which the autonomous driving control can be executed among sections S_RTk constituting the route RTk (1≤k≤n) from the current location of the vehicle 1 to the destination may be calculated. At least one of the processing of setting the route RTk and the processing of specifying the section S_AD is executed by the management server 200 or the processor 110 of the vehicle 1 based on the positional information on the current location and the destination of the vehicle 1. The current location of vehicle 1 includes the storage site ST (during the standby of the provision of the mobility service) and a point in the middle of the route RTn (during the provision of the mobility service). The destination of the vehicle 1 includes the point p1, the point p2, and the storage site ST shown in FIG. 3. The positional information on the current location and the destination is included in the various information stored in the memory device 120.

Examples of the section S_AD include a section of an expressway, a section dedicated to autonomous driving, and the like. If the section S_AD has been identified, the total distance L_AD can be calculated. The calculation of the total distance L_AD is executed by the processor 110 of the vehicle 1. In the second example of the enlargement process, the total distance L_AD is compared with the mileage ML. As a result of this comparison, if it is determined that the total distance L_AD is equal to or larger than the mileage ML, the enlargement processing is executed. A specific example of the enlargement processing is the same as that in the first example of the enlargement processing described above.

5. Route Setting Processing

In the present embodiment, setting processing of the route RTk is executed. The route RTk is a route from the current location of the vehicle 1 to the destination described in the second example of the enlargement processing. The setting processing of the route RTk may be executed by the management server 200 or the processor 110 of the vehicle 1 based on the positional information on the current location and the destination of the vehicle 1. The current location of the vehicle 1 includes the storage site ST (during the standby of the provision of the mobility service) and a point in the middle of the route RTn (during the provision of the mobility service). The destination of vehicle 1 includes the point p1, the point p2 and the storage site ST shown in FIG. 3.

Figure 6:
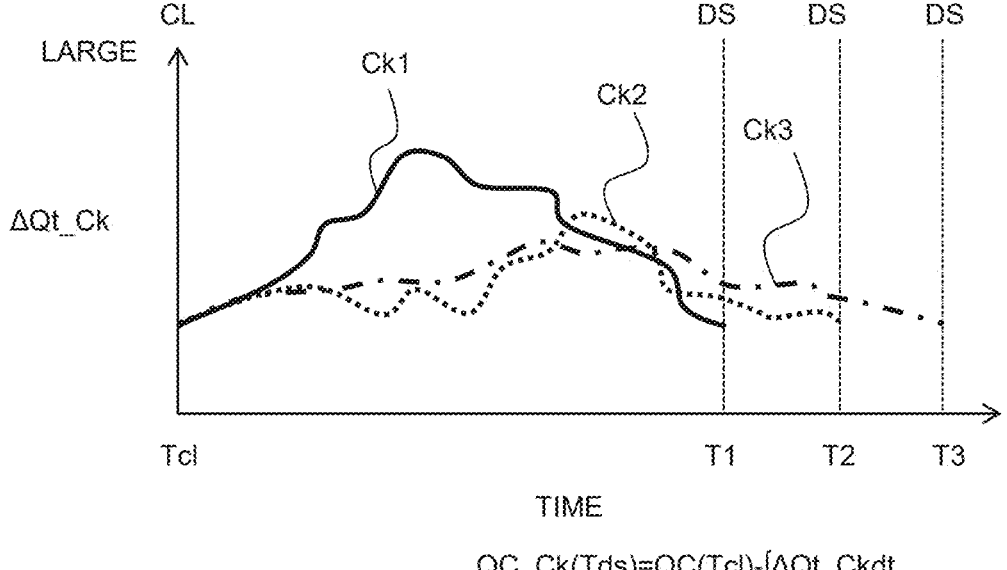
FIG. 6 is a diagram for illustrating a total quantity of log data generated while the vehicle travels along a candidate route.

When the setting processing of the route RTk is executed by the processor 110 of the vehicle 1, at least two candidate Cks of the route RTk may be set. In this case, a total quantity TQgn_Ck of the log data LOG generated during the travel of the vehicle 1 along the candidate Ck is predicted for the respective candidate Cks. FIG. 6 is a diagram for explaining the total quantity TQgn_Ck. In FIG. 6, candidates referred herein as Ck1, Ck2, and Ck3 (illustrated as C1, C2, and C3, respectively, in FIG. 6) are drawn as the candidate Cks of the route RTk. These candidates are all candidates of three route RTKs from the current location CL of the vehicle 1 to the destination DS. The time Tcl shown on the horizontal axis of FIG. 6 represents the current time. Further, times T1, T2, and T3 represent times at which the vehicle 1 arrives at a destination DS when vehicle 1 travels along the candidate Ck1, Ck2 and Ck3, respectively.

The vertical axis of FIG. 6 represents the generated quantity per unit time ΔQt_Ck of the log data LOG. As shown in FIG. 6, the generated quantity ΔQt_Ck differs among the candidates Ck1 to Ck3. This is because at least a part of the routes is different among the candidates Ck1 and Ck3. If at least a part of the route is different, a frequency and a difficulty of an event (e.g., an object recognition event, a driving plan generation event, a control amount calculation event, and the like) that occur in the log data LOG are different. In general, the higher the frequency of events per unit time, the larger the generated quantity ΔQt_Ck. Further, the higher the difficulty level of the event, the more the generated quantity ΔQt_Ck.

The total quantity TQgn_Ck1 of the log data LOG generated during the travel of the vehicle 1 along the candidate Ck1 is represented by the value $\int\Delta Qt\_Ck1 dt$ obtained by integrating the generated quantity ΔQt_Ck1 from the time Tcl to the time T1. The total quantity TQgn_Ck2 is represented by a value $\int\Delta Qt\_Ck2 dt$ obtained by integrating the generated quantity ΔQt_Ck2 from the time Tcl to the time T2. The total quantity TQgn_Ck3 is represented by a value $\int\Delta Qt\_Ck3 dt$ obtained by integrating the generated quantity ΔQt_Ck3 from the time Tcl to the time T3.

In the setting processing of the route RTk, a future value QC_Ck (Tds) of the free space QC at the time of arrival at the destination DS (arrival time Tds) is further calculated based on the total quantity TQgn_Ck. The future value QC_Ck (Tds) can be expressed by the following Equation (2) using the value of the free space QC at the time Tcl (i.e., the current value) QC (Tcl).

$$QC\_Ck(Tds) = QC(Tcl) - \int\Delta Qt\_Ckdt \qquad (2)$$

In the setting processing of the route RTk, the candidate Ck for which the future value QC_Ck (Tds) calculated by Equation (2) is the maximum is selected as the route RTk. If the candidate Ck has the maximum future value QC_Ck (Tds), it is possible to avoid the situation in which the free space QC is tight on the way to the destination DS. In the example of FIG. 6, the total quantity QC_Ck2 is the smallest. Therefore, the candidate Ck of which the future value QC_Ck (Tds) shown in Equation (2) is the maximum is the candidate Ck2, and this is selected as the route RTk.

What is claimed is:

1. An autonomous driving system mounted in a vehicle, comprising:
   one or more processors; and
   one or more memory devices,
   wherein the one or more processors is configured to execute:
   autonomous driving control of the vehicle;
   storing log data related to the autonomous driving control in the one or more memory devices during an execution of the autonomous driving control; and
   predicting a mileage of the vehicle by calculating a relationship between the mileage traveled by the execution of the autonomous driving control and a total quantity of log data generated during travel,
   wherein, in the predicting the mileage, the one or more processors is configured to acquire a free space of the one or more memory devices in which the log data is stored and to set the mileage in accordance with the free space,
   wherein the mileage is set to be shorter as the free space is smaller.

2. The autonomous driving system according to claim 1, wherein the one or more processors is further configured to execute enlarging the free space when the mileage which is set in accordance with the free space is equal to or shorter than a predetermined distance.

3. The autonomous driving system according to claim 1, wherein the one or more memory devices is configured to store positional information on a current position of the vehicle and a destination of the vehicle,
   wherein the one or more processors is further configured to execute:
   calculating a total distance of a section in which the autonomous driving control is executable among sections constituting a route from the current location to the destination based on the positional information on the current location and the destination; and
   enlarging the free space when the total distance is equal to or larger than the mileage which is set in accordance with the free space.

4. The autonomous driving system according to claim 1, wherein the one or more memory devices is configured to store positional information on a current position of the vehicle and a destination of the vehicle,
   wherein the one or more processors is further configured to execute setting a route from the current location to the destination based on the positional information on the current location and the destination,
   wherein, in the setting the route, the one or more processors is configured to:
   set at least two candidate routes;
   predict the total quantity of the log data generated while the vehicle travels along each of the candidate routes;
   predict respective future values of the free space in the one or more memory devices at a time of arrival at the destination of the candidate routes based on the total quantity of the log data predicted for each of the candidate routes; and
   select, as the route, a candidate route having a maximum future value of the free space from the candidate routes.

5. The autonomous driving system according to claim 1, wherein the one or more processors is further configured to execute:

obtaining the log data associated with the autonomous driving control, the log data including information on sensor detection input to the autonomous driving control;

uploading at least a part of the log data to a management server to verify the autonomous driving control using one or more machine learning models; and deleting the log data from the one or more memory devices.

\* \* \* \* \*